United States Patent [19]  [11] 4,091,124
Reighter  [45] May 23, 1978

[54] METHOD OF PRODUCING AN IMPROVED CONCRETE ELECTRICAL INSULATOR

[75] Inventor: David H. Reighter, Roslyn, Pa.

[73] Assignee: Gould Inc., Rolling Meadows, Ill.

[21] Appl. No.: 679,057

[22] Filed: Apr. 21, 1976

[51] Int. Cl.² .......................... B05D 5/12; B05D 1/18
[52] U.S. Cl. .................................. 427/58; 174/137 B; 427/238; 427/294; 427/350; 427/386; 427/407 R; 427/430 B; 428/413; 428/538
[58] Field of Search .................... 427/238, 294, 430 B, 427/407 R, 350, 386, 58; 428/413, 538, 454; 174/137 A, 137 B, 209, 210

[56] References Cited

U.S. PATENT DOCUMENTS

| 2,307,629 | 1/1943 | MacIldowie | 428/538 |
| 2,657,153 | 10/1953 | Russell | 427/407 R X |
| 2,861,011 | 11/1958 | Asbeck et al. | 427/407 R X |
| 3,004,862 | 10/1961 | Winslow | 427/294 X |
| 3,372,052 | 3/1968 | Polniaszek | 427/407 R X |
| 3,447,955 | 6/1969 | Wittenwyler | 428/413 X |
| 3,650,804 | 3/1972 | Parisi | 427/294 |
| 3,691,512 | 9/1970 | Exner | 427/430 B |
| 3,900,622 | 8/1975 | Caramanian | 428/413 X |
| 3,922,413 | 11/1975 | Reineman | 428/538 X |

FOREIGN PATENT DOCUMENTS

| 253,392 | 4/1961 | Australia | 427/294 |

*Primary Examiner*—Ralph S. Kendall
*Assistant Examiner*—Shrive P. Beck
*Attorney, Agent, or Firm*—Ostrolenk, Faber, Gerb & Soffen

[57] ABSTRACT

An improved electrical grade concrete insulator is prepared by immersing a self-supporting concrete body impregnated with an uncured polymer in a liquid curable resin bath, curing said polymer, separating said body from said resin bath whereby said body has a secondary impregnation filling the voids produced when the primary impregnation shrinks on curing. The residual resin on the outside also forms a thin sealant coating on the surface of said body.

10 Claims, No Drawings

METHOD OF PRODUCING AN IMPROVED CONCRETE ELECTRICAL INSULATOR

BACKGROUND OF THE INVENTION

There has been sporadic interest in cement concrete as electrical insulators since about 1952. Recently, this interest has quickened due to mainly to economic pressures brought about by the rise in cost of conventional porcelain and epoxy insulators.

A major problem in the use of concrete as an electrical insulator is the difficulty in constructing an insulator which has sufficient resistance to high humidity. Concrete is a mixture of an aggregate and a binder which can be cement or a polymer, or both. All polymers shrink to some extent when they are cured. Accordingly, when the polymer in a polymer containing concrete is cured, capillaries inevitably are formed and these capillaries permit atmospheric moisture access to the interior of the insulator body. Moisture is the single most deleterious component which affects the electrical properties of a polymer containing concrete. A seemingly insignificant amount of residual moisture, i.e., about 0.2% or less, can adversely affect the electrical properties.

In addition to allowing moisture access to the interior of the concrete insulator, the capillaries also allow air access to the interior of the insulator and facilitates the interconnection of electrically conducting air pockets. This is obviously undesirable.

A method has now been discovered which permits the adverse effect of the capillaries being formed during polymer curing to be overcome and additionally increases the mechanical strength of the insulator. The method involves the filling of the capillaries as they are being formed and additionally provides a sealant coating on the surface of the insulator.

It is the object of this invention to prepare a polymer containing electrical grade concrete in which the capillaries normally formed during polymer curing and their effect are largely overcome and the mechanical strength of the insulator body is improved. This and other objects of the invention will become apparent to those skilled in the art from the following detailed description.

SUMMARY OF THE INVENTION

This invention relates to a composite insulating material for indoor and outdoor use on electrical power systems and more particularly to the production of a polymer containing electrical insulation grade concrete. The concrete is produced by immersing a self-supporting concrete body, which has been dried and vacuum impregnated with a polymer, in a hot liquid resin bath, curing the impregnant, and at the same time introducing resin into the shrinkage pores produced as the primary impregnant cures. The resin clinging to the surface of the body is also cured simultaneously so as to form a thin sealant coating on the surface of the body.

DESCRIPTION OF THE PREFERRED EMBODIMENTS

The first step of the instant process involves the immersing of a self-supporting concrete body that has been vacuum impregnated with a polymer into a bath containing a hot liquid resin. The body is a mixture containing substantially uncured polymer, inorganic cement and aggregate.

The aggregate is that normally used in preparing concrete and is thus a conglomeration of broken stone, gravel, pebbles, glass-furnace slag or cinders, ceramics, sand and the like. Crushed electrical grade porcelain forms an excellent aggregate. The conglomeration of materials forming the aggregate should have a variety of particle size to reduce the amount of volume which will be filled by the binder portion of the concrete.

The primary binder portion of the concrete is a cement or a mixture of a curable polymer and cement. The cements applied are those normally used in preparing concrete and thus, for example, either Portland cement or aluminous cement or mixtures thereof can be used. The particular cement employed will be chosen on the basis of the particular end use application contemplated and it is, of course, preferred to use a cement which has a minimum amount of electrical conductive material within it.

The polymer employed can be any electrical insulation grade curable resin which will bind the aggregate particles together and seal the porosity when it is hardened. Accordingly, epoxy resins, polyester resins, polyurethane resins, polyolefin resins, silicone resins, and the like can be used. The polymer is chosen from commercially available products on the basis of its electrical characteristics, hydrophobic characteristics, ability to bind the aggregate and handleability. The preferred polymer is an electrical insulation grade epoxy resin. It will be understood by those skilled in the art that the polymer can contain a curing agent which is adapted to be effective at other than ambient conditions. For example, it is preferred to formulate the epoxy resin polymer with a suitable hardening agent and catalyst, such as an anhydride or amine, which cure the epoxy resin at elevated temperature.

When the body contains the polymer, cement and aggregate, it is preferred to cure the cement to the point that a self-supporting body is obtained under conditions where the polymer remains totally uncured.

The resin in which the body is immersed can be the same or different than the polymer used in impregnating the concrete body. The resin is chosen from commercial products using the same considerations as used to select the polymer, namely, electrical insulating properties, hydrophobic characteristics and handleability, and additionally, on the ability to form a sealant coating on the surface of the body. The higher molecular weight resins are preferred because they tend to be more water resistant. The resin is also chosen on the basis of its ability to cure under conditions other than that at which the polymer in the concrete cures. For example, the resin can be curable at a higher temperature than the polymer. This can also be accomplished by employing a resin without a curing agent. For example, the preferred polymer in the concrete can be an epoxy resin which is formulated with a hardener and catalyst adapted to cure the polymer at, for example, 350° F. The liquid resin can be the same epoxy resin without hardener and catalyst so that it will not cure at 350° F, except inside the capillaries where it contacts the primary impregnant containing hardener and/or catalyst. As the liquid curable resin, the epoxy and polyurethane resins are preferred. The curable resin bath is generally maintained at an elevated temperature above about 40° C and below the curing temperature of the resin, preferably about 70°–100° C.

After the concrete body is immersed in the liquid curable resin bath, the polymer in the concrete is cured. This can be effected by the application of heat, ultraviolet radiation or other procedures known to those skilled in the art. It is preferred, however, to effect curing by the application of heat. In general, it is preferred that the polymer be adapted to cure at 200° to 400° F. in a time which can range from about 0.25 hour upward. Preferably, the polymer is adapted to cure at about 350° F. in about 0.5 hour. As the polymer cures, shrinkage occurs and capillaries open up. Since the body is immersed in the liquid curable resin, the resin is drawn into the body and fills the capillaries. As noted above, the preferred polymer in the concrete is an epoxy resin which has been formulated with a hardener and catalyst so that it cures at elevated temperature. It is preferred to use a resin which will cure at the same temperature when contacted with either the hardener or catalyst, or both, in the epoxy formulation. It is believed that as the polymer cures and shrinks, the resulting vacuum causes the resin to be drawn into the capillaries, and the resin drawn into the capillaries is able to extract sufficient hardener and/or catalyst from the curing polymer to also cure and thereby fill the capillaries with cured resin while at the same time leaving the resin in the bath and contacting the surface of the body in an uncured condition.

After the polymer in the concrete is cured, the resin is cured so as to form a sealant coating at any pore openings on the surface of the body. It is preferred to separate the body from the liquid curable resin bath. Separation is not necessary but, in general, leaving a body in the bath (after gelation of the impregnated polymer) is uneconomical, time consuming and yields an uneven coating. The manner in which the resin is cured is conventional and, therefore, can be by application of heat, etc.

In order to further illustrate the present invention, various examples are set forth below. In these examples, as well as throughout this specification and claims, all parts and percentages are by weight and all temperatures and degrees are Centigrade unless otherwise indicated.

EXAMPLE 1

250 parts of white Portland cement, 510 parts of coarse electrical grade porcelain, 176 parts of medium size (1/32nd inch) electrical grade procelain and 165 parts of water were mixed and then vacuum deaerated and vacuum dehydrated by the method described in co-pending application Ser. No. 595,179 filed July 11, 1975 now U.S. Pat. No. 4,017,321 issued Apr. 12, 1977. The resulting body was allowed to cure for 16 hours at room temperature and 100% relative humidity followed by drying for one hour in a microwave oven and then cooling to room temperature in a dessicator. The cement concrete was then impregnated with an epoxy resin which contained 100 parts of a hydantoin epoxy resin (XB2793 manufactured by Ciba), 116 parts of methyl tetrahydrophthlic anhydride hardener and 0.5 part of benzyldimethylamine catalyst. The resulting polymer containing concrete contained 11.5% of the epoxy resin.

The resulting body was then immersed in a bath containing a high molecular weight bisphenol A epoxy resin without hardener which was maintained at 80° C. After 3.25 hours, the body was removed from the bath and placed in an oven at 149° C. for 4 hours. Thereafter the body was vapor degreased and a supplemental surface coating of a polyurethane was applied by spray coating.

The properties of the resulting electrical insulator are set forth in the following table.

| PROPERTIES (TEST METHOD) | VALUE |
|---|---|
| Compressive Strength PSI (ASTM C-39) | 22,175 |
| Dielectric Strength VPM | 200 – 250 |
| Inclined Plane Track Test, Minutes | >1,200 |
| Dissipation Factor (% tan δ) at 25° C | 3 |
| Dielectric Constant at 25° C | 6 |
| Flexural Strength PSI (ASTM D-790) | 6,280 |
| Heat Distortion ° C (ASTM D-648) | >150 |
| Arc Resistance, Seconds (ASTM D-495) | 200.6 |
| Flame Retardancy, seconds (ASTM D-229) | |
| Ignition | 131 |
| Burn Time | 83 |
| Thermal Cycle −40° C to 25° C to +105° C | 10 cycles acceptable |
| Long Term Heat Deflection - in/in at 264 PSI | |
| at 115° C | <0.0015 |
| at 130° C | <0.010 |
| at 155° C | <0.010* |
| at 180° C | <0.010** |
| at 200° C | failed by rupture |

*equivalent to class F insulation
**equivalent to class H insulation

EXAMPLES 2 – 4

The procedure of Example 1 was repeated except that in place of the hydantoin epoxy resin, a polyester resin, a cycloaliphatic epoxy resin and a bisphenol epoxy resin were employed. The resulting polymer containing concretes were found to have been impregnated with the polymer in the amount of 8%, 4.7%, and 6.6% respectively.

EXAMPLE 5

The effect of temperature on the dielectric constant and the dissipation factor of the insulator produced in Example 1 was evaluated relative to the same properties of electrical insulation grade procelain. It was found that over a temperature range of 25° to 110° C, the dielectric constant at 60 Hz of the insulator of Example 1 was less than that of the porcelain. It was also found that the dissipation factor (Tan δ) at 60 Hz over a temperature range of about 25° to 95° C. of the insulator of Example 1 was slightly less than the dissipation factor of the porcelain.

EXAMPLE 6

In order to determine the effect of relative humidity on the electrical insulators, the insulator of Example 1 was compared with an insulator prepared in the same manner except that after impregnation with the hydantone epoxy resin, the resin was cured at 80° in an oven.

At ambient temperature and relative humidity (about 25° C and 50% relative humidity), the two insulators had the same dielectric constant at 60 Hz. The dissipation factor (tan δ) at 60 Hz of the insulator of Example 1 was significantly less. The dissipation factor of the oven cured insulator was initially about 0.029, was about 0.035 after 12 days and was about 0.055 after 23 days. The dissipation factor of the insulator of Example 1 was initially about 0.015, was about 0.025 after 13 days and was about 0.0275 after 23 days.

Aging the two insulators at 25° C. and 90% relative humidity showed significant differences in the dielectric constant and dissipation factor at 60 Hz. With respect to the dielectric constant, the oven cured insulator initially had a dielectric constant of 4.7 which increased to 5.2 after about five days and thereafter increased so rapidly as to be undeterminable. The insulator of Example 1 had an initial dielectric constant of 4 which remained essentially unchanged over the first ten days and thereafter slowly increased to about 4.6 after 90 days. The dissipation factor for the oven cured insulator was initially 0.12 which increased to about 0.22 after about 3 days and to 0.26 after four days. The coated insulator of Example 1 had an initial dissipation factor of about 0.054 which increased to about 0.064 after 5 days and then substantially linearly increased to about 0.12 after 90 days.

EXAMPLES 7–9

Example 1 was repeated three times using a different liquid resin and the slope angle measured. Slope angle is an arbitrary comparison of the rate of rise using the same abscissa and ordinate scales.

The slope angle of the rate of rise of the dissipation factor upon aging at 90% relative humidity and 25° C. for the insulator of Example 1 was 8°. An 8° slope angle was also found when a silica filled bisphenol epoxy resin was substituted for the urethane in Example 1. When a different silica filled bisphenol epoxy resin was substituted, in its entirety for the impregnated concrete the slope angle was 12° and when a silica filled cycloaliphatic epoxy resin was substituted in its entirerty for the impregnated concrete, the slope angle was 21°.

EXAMPLE 10

In order to demonstrate the formation of capillaries, the following experiment was carried out. The hydantoin epoxy resin used in Example 1 shrinks 0.0074 inch per inch. The procedure of Example 1 was repeated except that a red pigment was added to the hot liquid epoxy resin (secondary impregnant). The final insulator, a 3 inches × 6 inches cylinder, was sectioned and the red pigment was found throughout.

Various changes and modifications can be made in the process of this invention without departing from the spirit and scope thereof. The various embodiments set forth herein were for the purpose of further illustrating the invention but were not intended to limit it.

I claim:

1. A method of producing an improved polymer containing concrete electrical insulator which comprises (a) immersing a self-supporting concrete body comprising a mixture of cement and aggregate, which has curable resin bath, (b) curing said polymer while immersed in said bath under conditions such that the entire resin bath does not also cure, (c) separating said body from said resin bath, and then (d) curing said resin so as to form a secondary sealant of the porosity of said body caused by the shrinkage of said uncured polymer as it cures.

2. The method of claim 1 wherein said polymer is an electrical insulation grade epoxy resin.

3. The method of claim 2 wherein said polymer is an uncured epoxy resin which additionally contains hardener and catalyst therefor, the combination of epoxy resin, hardener and catalyst being adapted to cure at other than ambient conditions.

4. The method of claim 3 wherein said epoxy resin, hardener and catalyst are adapted to cure at 200° to 400° F.

5. The method of claim 4 wherein said epoxy resin is a hydantoin epoxy resin and said hardener is an anhydride hardener.

6. The method of claim 1 wherein said self-supporting concrete body comprises a mixture of substantially uncured polymer, Portland cement and aggregate.

7. The method of claim 6 wherein said polymer is an electrical insulation grade epoxy resin.

8. The method of claim 7 wherein said polymer is an uncured epoxy resin which additionally contains hardener and catalyst therefor, the combination of epoxy resin, hardener and catalyst being adapted to cure at other than ambient conditions.

9. The method of claim 8 wherein said epoxy resin, hardener and catalyst are adapted to cure at 200 to 400° F.

10. The method of claim 9 wherein said epoxy resin is a hydantoin epoxy resin and said hardener is an anhydride hardener.

* * * * *

UNITED STATES PATENT AND TRADEMARK OFFICE
CERTIFICATE OF CORRECTION

PATENT NO. : 4,091,124
DATED : May 23, 1978
INVENTOR(S) : David H. Reighter

It is certified that error appears in the above-identified patent and that said Letters Patent are hereby corrected as shown below:

Column 6, line 5 - after "has" please insert --been vacuum impregnated with an uncured polymer, in a liquid--

Signed and Sealed this

Ninth Day of October 1979

[SEAL]

Attest:

RUTH C. MASON
Attesting Officer

LUTRELLE F. PARKER
Acting Commissioner of Patents and Trademarks